US005753845A

United States Patent [19]

Nagata et al.

[11] Patent Number: 5,753,845

[45] Date of Patent: May 19, 1998

[54] KARAOKE APPARATUS CREATING VOCAL EFFECT MATCHING MUSIC PIECE

[75] Inventors: Yuichi Nagata; Satoshi Suzuki, both of Hamamatsu, Japan

[73] Assignee: Yamaha Corporation, Hamamatsu, Japan

[21] Appl. No.: 721,440

[22] Filed: Sep. 27, 1996

[30] Foreign Application Priority Data

Sep. 28, 1995 [JP] Japan .................................... 7-251469

[51] Int. Cl.$^6$ ................................ G09B 5/00; G10H 1/02

[52] U.S. Cl. ......................... 84/626; 84/630; 84/DIG. 26; 434/307 A

[58] Field of Search ..................... 84/626–633, 662–665, 84/701–711, 737–741, DIG. 1, DIG. 4, DIG. 26, DIG. 27, DIG. 22; 434/307 A

[56] References Cited

U.S. PATENT DOCUMENTS

| | | | |
|---|---|---|---|
| 5,218,580 | 6/1993 | Okamura et al. | 369/4 X |
| 5,446,238 | 8/1995 | Koyama et al. | 84/DIG. 22 |
| 5,521,326 | 5/1996 | Sone | 84/631 |
| 5,542,000 | 7/1996 | Semba . | |

*Primary Examiner*—Stanley J. Witkowski
*Attorney, Agent, or Firm*—Pillsbury Madison & Sutro LLP

[57] ABSTRACT

In a karaoke apparatus, a pickup device picks up a live singing voice of a music piece to convert the same into a vocal signal. A music source device provides a music signal representative of a karaoke accompaniment of the music piece to accompany the live singing voice, and also provides effect control information which is predetermined in matching with a mood and a tempo of the music piece and which is effective to create and control a vocal effect. A vocal effecter device processes the vocal signal according to the provided effect control information to apply the vocal effect to the live singing voice and to control the applied vocal effect. A mixer device mixes the provided music signal and the processed vocal signal with each other to concurrently reproduce the karaoke accompaniment and the live singing voice which is modified by the applied vocal effect so as to enrich karaoke performance of the music piece.

10 Claims, 9 Drawing Sheets

KARAOKE APPARATUS CREATING VOCAL EFFECT MATCHING MUSIC PIECE

BACKGROUND OF THE INVENTION

The present invention relates to a karaoke apparatus which imparts various effects to a live singing voice.

A karaoke apparatus mixes a vocal signal corresponding to a live singing voice inputted through a microphone to a music signal reproduced from a musical source and representative of melody and accompaniment of a karaoke music piece. The mixed signals are sounded through a loudspeaker. In recent years, in order to modify a singer's vocal tones more beautifully, various types of karaoke apparatuses have been developed, which impart vocal effects such as echo and reverb to the vocal tones collected through the microphone.

On the other hand, a type and pattern of the vocal effect appropriate for vocal tones depends on a music genre or the like of a musical piece to be performed. For example, in the case of leisurely music such as ballads, it is preferable to prolong an echo interval (hereinafter referred to as "delay time") and to increase a repetition time. On the other hand, in the case of high-tempo music such as rock, if the delay time of echo is prolonged or the repetition time is increased, an effect tone applied to a preceding vocal tone overlaps a succeeding vocal tone, thereby making it difficult to sing. In the conventional karaoke apparatuses, there has been a type where the delay time of echo or the like can be variably set. However, it is quite bothersome for a user to manually change the setting of echo music piece by music piece. Further, since the user can evaluate effect of the echo only after hearing the musical piece, the proper setting could not be achieved before the performance of music is started.

SUMMARY OF THE INVENTION

The present invention has been made under such a background and has an object to provide a karaoke apparatus which is capable of automatically selecting a proper vocal effect per musical piece to be performed and imparting the selected vocal effect to an inputted vocal tone of a live singing voice.

Further, the present invention also has an object to provide a karaoke apparatus which is capable of changing a vocal effect, which has been designated at the start of the karaoke performance, during the course of the progress of the music.

According to the invention, a karaoke apparatus comprises a pickup device that picks up a live singing voice of a music piece to convert the same into a vocal signal, a music source device that provides a music signal representative of a karaoke accompaniment of the music piece to accompany the live singing voice and that provides effect control information which is predetermined in matching with at least either a mood or a tempo of the music piece and which is effective to create and control a vocal effect, a vocal effecter device that processes the vocal signal according to the provided effect control information to apply the vocal effect to the live singing voice and to control the applied vocal effect, and a mixer device that mixes the provided music signal and the processed vocal signal with each other to concurrently reproduce the karaoke accompaniment and the live singing voice which is modified by the applied vocal effect so as to enrich karaoke performance of the music piece.

In a specific form, the music source device comprises means for providing initial effect control information before the karaoke performance is commenced such that the vocal effecter device is established according to the initial effect control information to initially set an adequate vocal effect in generally matching with the music piece. Further, the music source device comprises means for providing transitional effect control information during the course of the karaoke performance to transitionally control the initially set vocal effect in specifically matching with progression of the music piece. In a preferred form, the vocal effecter device comprises means for discriminating the provided effect control information to specify a corresponding effect pattern of the vocal effect, memory means for memorizing a plurality of effect patterns, means for retrieving the specified one of the effect patterns from the memory means, and creating means for creating the vocal effect according to the retrieved effect pattern. In such a case, the memory means comprises means for memorizing the effect pattern in the form of a microprogram which is loaded into the creating means to enable the same to create the vocal effect. In a specific form, the vocal effecter device comprises means for creating a specific vocal effect selected from a group consisting of an echo, a reverberation and a frequency characteristic adjustment. For example, the vocal effecter device comprises means for relatively impressing the echo for a slow tempo of the music piece, and for relatively suppressing the echo for a fast tempo of the music piece.

DETAILED DESCRIPTION OF THE INVENTION

Figure 1:
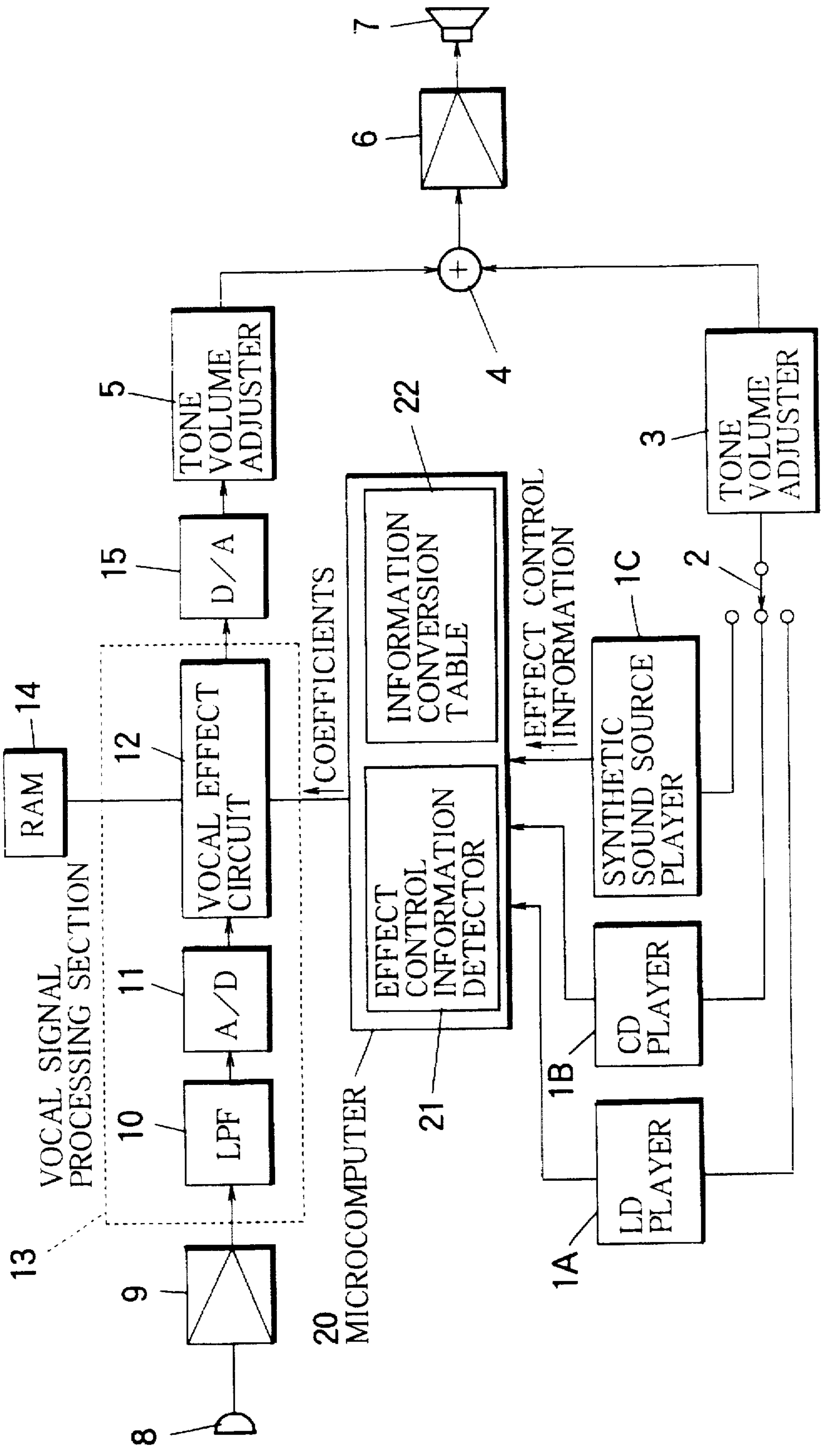
FIG. 1 is a block diagram showing one embodiment of the present invention.

Hereinbelow, embodiments of the present invention will be described with reference to the drawings. FIG. 1 is a block diagram showing a whole structure of one embodiment of the present invention. In FIG. 1, 1A denotes an LD (laser disk) player, and 1B denotes a CD (compact disk) player. These players 1A and 1B respectively store karaoke music data such as melodies and accompaniments of a given number of karaoke musical pieces. During karaoke performance, the player reproduces the music data of a designated musical piece and outputs a corresponding music signal. 1C denotes a synthetic sound source player which synthesizes musical tones based on music data such as MIDI (musical instrument digital interface) data supplied from a host computer via a communication line, and which outputs a music signal. Output terminals of the foregoing players 1A to 1C are selectively connectable to a tone volume adjuster 3 by means of a change-over switch 2. These players 1A, 1B and 1C constitute a music source device. The tone volume adjuster 3 adjusts a volume level of a music signal fed from the player 1A, 1B or 1C and outputs the adjusted music signal. 4 denotes a mixer device which mixes the music signal outputted from the tone volume adjuster 3 and a vocal signal corresponding to a vocal tone of a live singing voice whose volume level is adjusted by another tone volume adjuster 5, and which outputs the mixed signals to an amplifier 6. The amplifier 6 amplifies an output of the mixer 4 and outputs the amplified signal to a speaker 7. The speaker 7 emits the vocal tones together with the karaoke musical tones based on an output of the amplifier 6.

8 denotes a microphone provided as a pickup device which converts a vocal tone of the karaoke singer into an electric vocal signal and outputs the vocal signal. 9 denotes a microphone amplifier which amplifies the vocal signal outputted from the microphone 8 and outputs the amplified vocal signal.

10 denotes an LPF (low-pass filter), 11 denotes an A/D (analog-to-digital) converter, and 12 denotes a vocal effect circuit, those of which constitute a vocal signal processing section 13. The LPF 10 removes harmonic components such as noises from the vocal signal outputted from the amplifier 9. The A/D converter 11 converts the analog vocal signal outputted from the LPF 10 into a digital vocal signal. The vocal effect circuit (vocal effecter device) 12 is formed by a DSP (digital signal processor). By executing a microprogram for signal processing, the vocal effect circuit 12 modifies or adjusts a frequency characteristic of the vocal signal converted into the digital signal through the A/D converter 11, and further imparts a vocal effect such as echo and reverb to the vocal signal. Details of the vocal effect circuit 12 will be described later. Further, 14 denotes a RAM (random access memory) which stores the microprogram which is executed by the voice signal processing section 13 for functionally establishing the vocal effect circuit 12. 15 denotes a D/A (digital-to-analog) converter which converts the digital vocal signal into an analog vocal signal and outputs the same to the tone volume adjuster 5. As described before, the tone volume adjuster 5 adjusts a volume level of the vocal signal outputted from the D/A converter 15 and outputs the adjusted vocal signal to the mixer 4.

20 denotes a microcomputer which controls the foregoing various sections of the karaoke apparatus. The microcomputer 20 is constituted by a hardware such as a CPU (central processing unit), a ROM (read only memory) and a RAM, and realizes software functions such as an effect control information detector 21 and an information conversion table 22. The effect control information detector 21 discriminates effect control information such as mode data which is supplied along with the reproduction or the synthesization of the music signal in the foregoing player 1A, 1B or 1C. Further, the information conversion table 22 holds vocal effect control coefficients corresponding to the effect control information. Specifically, the microcomputer 20 discriminates the effect control information supplied from the player 1A, 1B or 1C, reads out a coefficient corresponding to the effect control information from the information conversion table 22, and sets the vocal effect circuit 12 using the coefficient.

Figure 2:
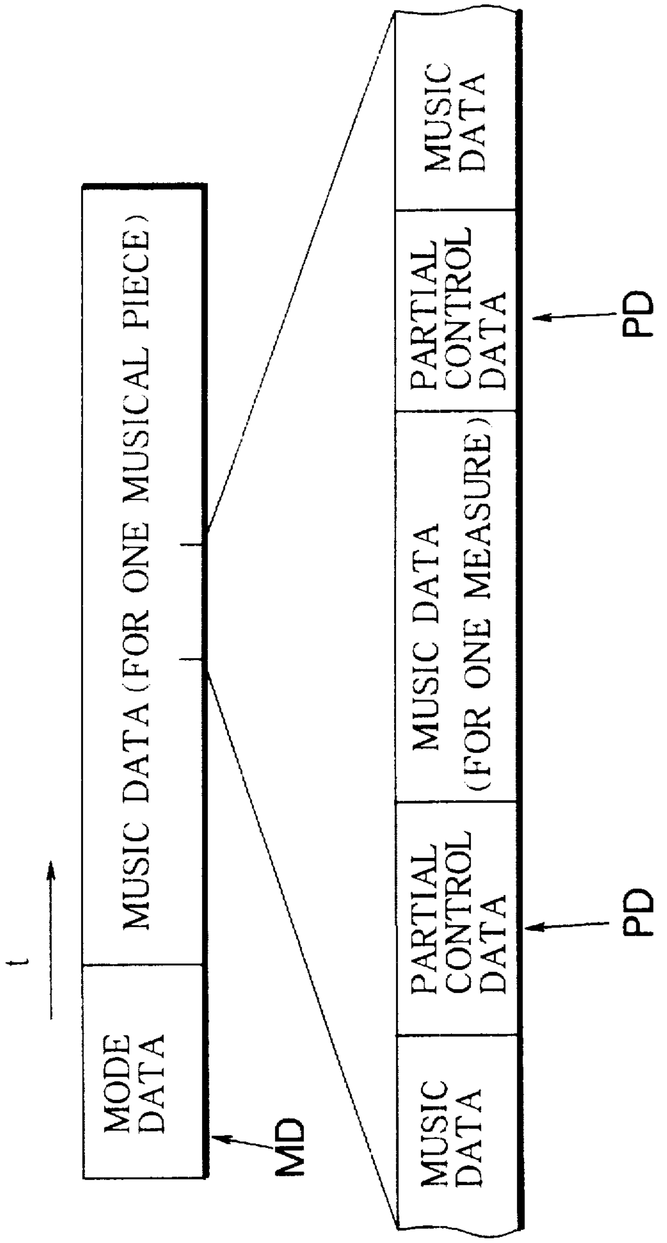
FIG. 2 is a diagram showing a data format of effect control information used in the embodiment.

Next, the effect control information will be explained with reference to a format of the music data shown in FIG. 2. As shown in the figure, mode data MD is added to a header of the music data of one musical piece as the initial effect control information. The mode data MD represents a vocal effect mode suitable for attribute or nature of the corresponding musical piece. In this embodiment, four vocal effect modes are available, that is, a standard mode creating a standard vocal effect, a ballad mode creating a vocal effect suitable for a leisurely music piece such as ballad, a rock mode creating a vocal effect suitable for high-tempo music piece such as rock, and a professional mode creating a vocal effect suitable for a singer having high singing ability or powerful voice. By means of the mode data MD for designating one of the four modes, the state of the vocal effect can be controlled musical piece by musical piece.

Further, as transitional effect control information, the music data of each musical piece includes partial control data PD for transitionally controlling the vocal effect, for example, measure by measure during the course of progression of the musical piece. The partial control data PD is effective for designating, for example, an echo interval (delay time), an echo length (echo time), an echo level, a reverb length (reverb time) and a frequency characteristic adjustment degree. By the partial control data PD, it is possible to adaptively control and modify the initial vocal effect depending on change of the tempo of the music piece. Otherwise, a special vocal effect is given to a significant part of the music piece or the like.

Figure 3:
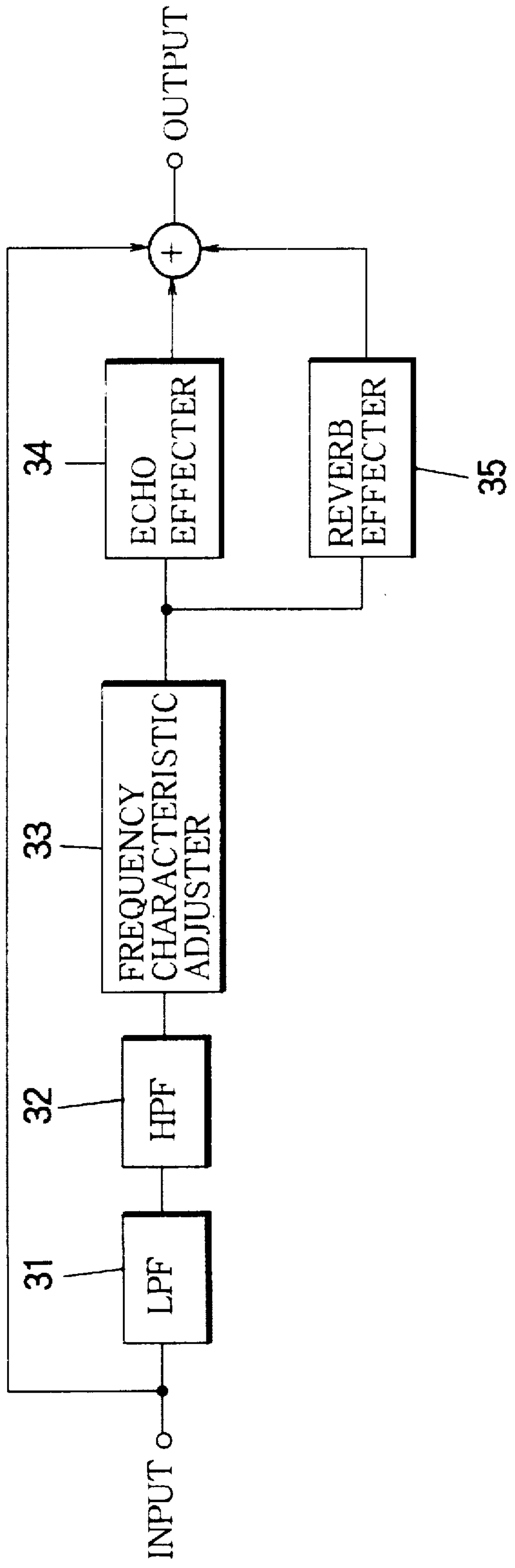
FIG. 3 is a block diagram showing an example of a structure of a vocal effect circuit provided in the embodiment.

Next, a structure of the vocal effect circuit 12 will be explained with reference to FIG. 3. As shown in FIG. 3, the vocal effect circuit 12 is constituted by an LPF (low-pass filter) 31, a HPF (high-pass filter) 32, a frequency characteristic adjuster 33, an echo effecter 34 and a reverb effecter 35. The LPF 31 and the HPF 32 remove harmonic components and low-frequency components such as noises from the inputted vocal signal so as to pass only the components of a necessary frequency band.

Figure 4:
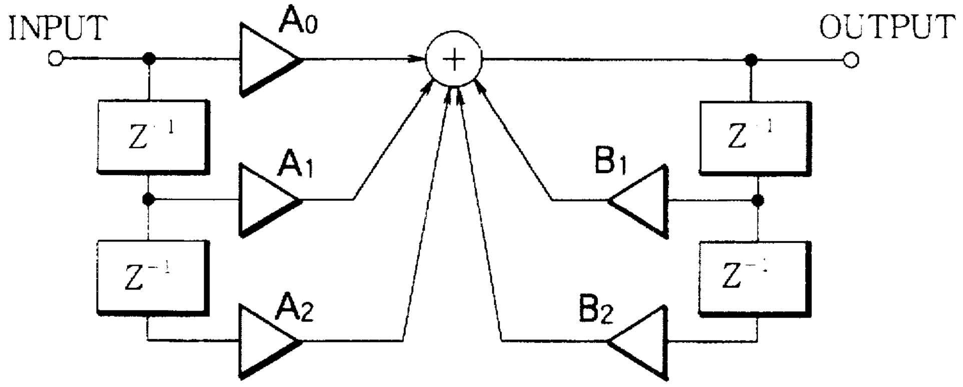
FIG. 4 is a block diagram showing an example of a structure of a frequency characteristic adjuster provided in the vocal effect circuit.

The frequency characteristic adjuster 33 is constituted as, for example, a digital filter typically shown in FIG. 4. In the figure, filter factors A0, A1, A2, B1 and B2 are set based on coefficients supplied from the microcomputer 20. The inputted vocal signal is adjusted so as to have a frequency characteristic corresponding to the factors.

Figure 5:
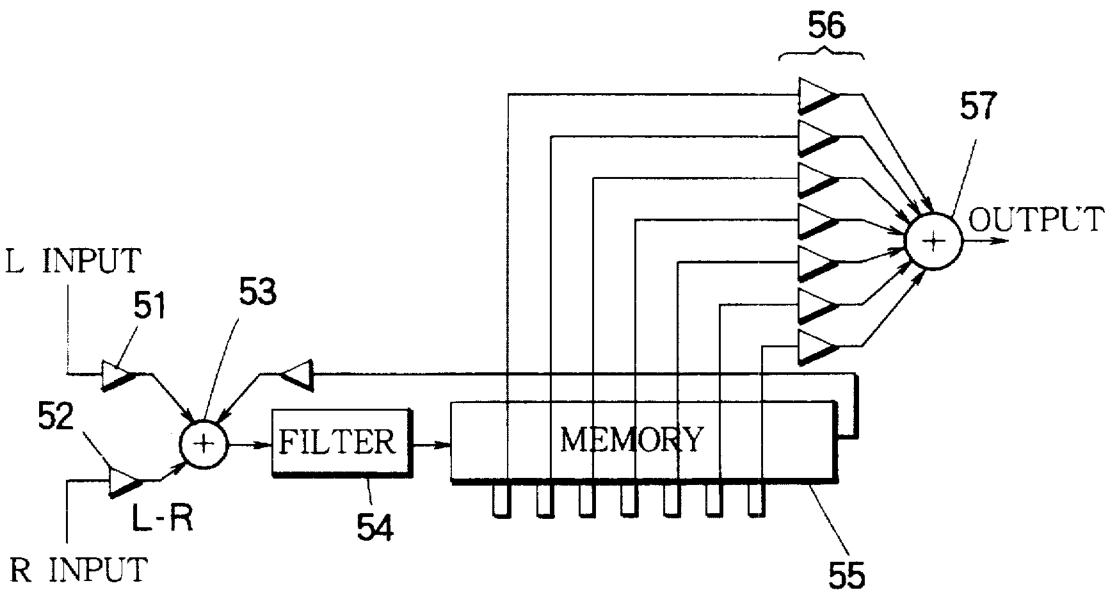
FIG. 5 is a block diagram showing an example of a structure of an echo effecter provided in the vocal effect circuit.

The echo effecter 34 is constituted as, for example, a digital filter typically shown in FIG. 5. In the figure, L and R input vocal signals are adjusted in level through attenuators 51 and 52, and a differential signal represented by L-R is produced through an adder 53. This differential signal is inputted into a delay memory 55 via a surround component adjusting filter 54. The memory 55 imparts a delay time to the vocal signal based on a time difference between a writing time point and a reading time point. A delayed signal group read out from the memory 55 is adjusted in level by an attenuator group 56 and integrated by an adder 57. By performing such signal processing, an echo pattern given to the vocal signal is produced. The delay time is controlled by the time difference between the writing time point and the reading time point in the delay memory 55, and the echo level is controlled by factors of the attenuator group 56.

Figure 6:
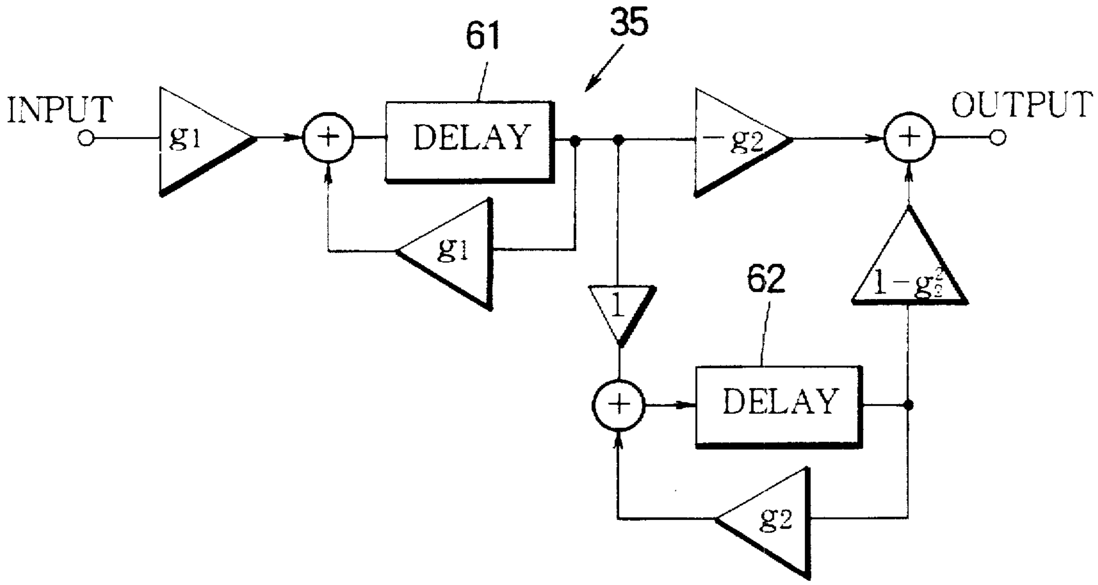
FIG. 6 is a block diagram showing an example of a structure of a reverb effecter provided in the vocal effect circuit.

Further, the reverb effecter 35 is constituted as, for example, a digital filter typically shown in FIG. 6. In the figure, by controlling delay times and gain factors g1 and g2 in delay circuits 61 and 62, a configuration of a reverb pattern given to the vocal signal can be controlled.

However, the echo effecter 34 and the reverb effecter 35 are established in different structures depending on the vocal effect mode designated by the mode data MD. Specifically, microprograms corresponding to the respective vocal effect modes are stored in a ROM within the microcomputer 20. Through execution, by the DSP, of the microprogram corresponding to the vocal effect mode designated by the microcomputer 20, the echo effecter 34 and the reverb effecter 35 are specialized for performing processes corresponding to the vocal effect mode. On the other hand, the frequency characteristic adjuster 33 takes the same circuit structure (see FIG. 4) since the same microprogram is executed even if any of the vocal effect modes is designated. However, since the different filter factor is set depending on the vocal effect mode, the adjuster 33 performs such an adjustment as to provide a frequency characteristic in matching with the designated vocal effect mode.

Next, operation of the embodiment having the foregoing structure will be described. First, provisional operation until the vocal effect mode is designated will be explained. After the karaoke apparatus is powered on, when the LD player 1A is selected to designate a desired musical piece and the start of karaoke performance is instructed from a key controller, the change-over switch 2 is switched to a side of the LD player 1A which then starts reproduction of the designated musical piece. The music signal reproduced by the LD player 1A is adjusted in volume level by the tone volume adjuster 3 and is then sent to the mixer 4. The microcomputer 20 discriminates the mode data MD contained in the reproduced music signal of the LD player 1A, and designates, to the voice signal processing section 13, a microprogram corresponding to the discriminated mode data MD. By this, the designated microprogram is executed in the voice signal processing section 13. Further, the microcomputer 20 sets a filter factor corresponding to the mode data MD in the voice signal processing section 13. In this fashion, the vocal effect circuit 12 is set and established for creating the vocal effect corresponding to the mode data MD.

On the other hand, if the CD player 1B is selected by the key controller, the change-over switch 2 is switched to a side of the CD player 1B which then reproduces the music data. The other operation is the same as that of the foregoing LD player 1A.

Further, if the synthetic sound source player 1C is selected by the key controller, the change-over switch 2 is switched to a side of the sound source player 1C, and music data of the designated musical piece is read out from an external storage medium. The music data is initially supplied from a host computer, and is once stored in an external storage medium such as a hard disk so as to be fed to the sound source player 1C. By this, the sound source player 1C produces the music signal through the musical tone synthesization. The microcomputer 20 discriminates the mode data MD contained in the music data supplied via the sound source player 1C. The other operation is the same as those of the foregoing players 1A and 1B.

As described above, the vocal effect modes selectively designated at the start of karaoke performance include (1) standard mode, (2) ballad mode, (3) rock mode and (4) professional mode. Hereinbelow, an operation corresponding to each vocal effect mode will be explained.

(1) Standard Mode

Figure 7:
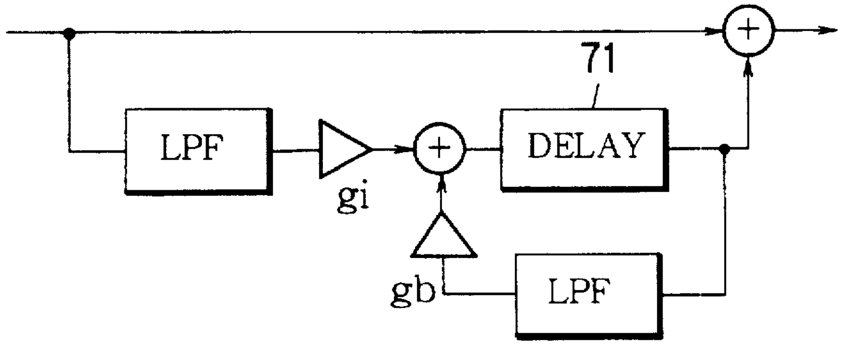
FIG. 7 is a diagram showing an example of a structure of a vocal effect circuit (excluding the frequency characteristic adjuster) adapted in a standard mode.

This mode is selected for giving the so-called standard vocal effect. As shown in FIG. 7, the vocal effect circuit 12 in this mode is arranged as an echo effect circuit wherein an output of a delay circuit 71 is fed back with a gain gb. As described before, since the frequency characteristic adjuster 33 takes the same structure (see FIG. 4) with respect to all the vocal effect modes, the adjuster 33 is not shown in the figure.

Figure 8A:
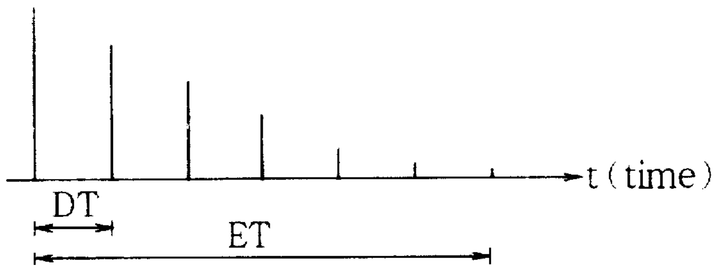
FIGS. 8(*a*) and 8(*b*) are graphs illustrating a vocal effect created in the standard mode, wherein FIG. 8(*a*) shows an impulse response and FIG. 8(*b*) shows a frequency characteristic.
Figure 8B:
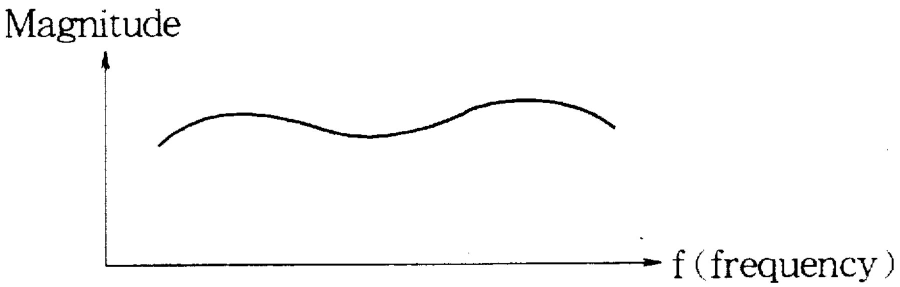

According to the vocal effect circuit 12 shown in FIG. 7, an impulse response as shown in FIG. 8(*a*) is achieved. Specifically, the echo component having a delay time DT and an echo time ET is added to the vocal signal. In this case, the reverb component is not added. The echo time ET is prolonged as the gain gb (see FIG. 7) increases, while shortened as the gain gb decreases. On the other hand, the delay time DT is determined by the delay circuit 71. In this case, the delay time DT is set to a value about 150 ms which can match with either of the high-tempo music and the low-tempo music.

As shown in FIG. 8(*b*), the frequency response of the vocal effect circuit 12 is regulated such that a low-frequency band and a high-frequency band are raised. Specifically, when the frequency characteristic is raised at the low-frequency band, "NORI" of the vocal tone is improved such that the sound becomes massive. On the other hand, when the frequency characteristic is raised at the high-frequency band, "NUKE" of the vocal tone is improved such that the sound becomes sharp.

(2) Ballad Mode

Figure 9:
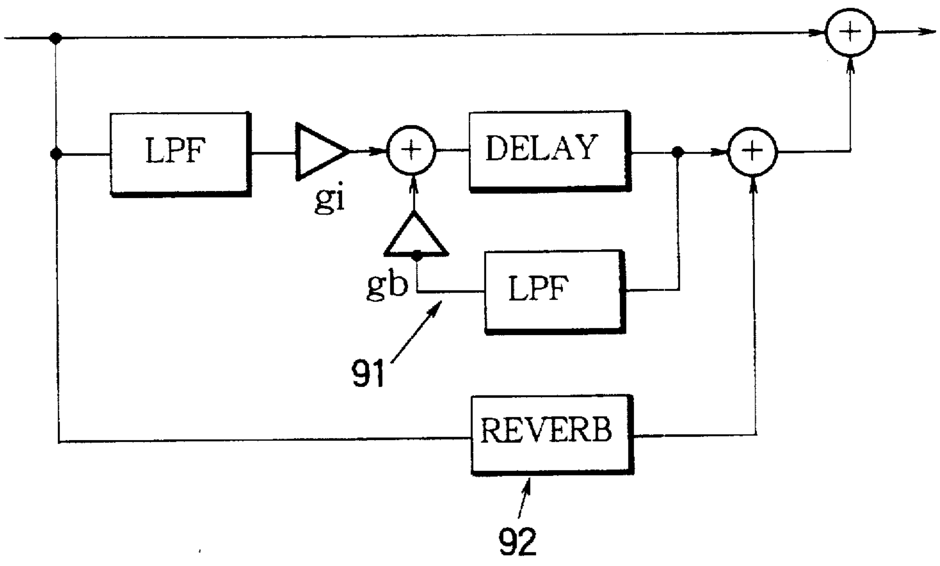
FIG. 9 is a diagram showing an example of a structure of a vocal effect circuit (excluding the frequency characteristic adjuster) adapted in a ballade mode.

This mode is selected for giving the vocal effect suitable for leisurely music such as ballad. As shown in FIG. 9, the vocal effect circuit 12 in this mode is arranged such that an echo producing circuit 91 and a reverb producing circuit 92 are connected in parallel to each other. Due to the foregoing reason, the frequency characteristic adjuster 33 is not shown in the figure.

Figure 10:
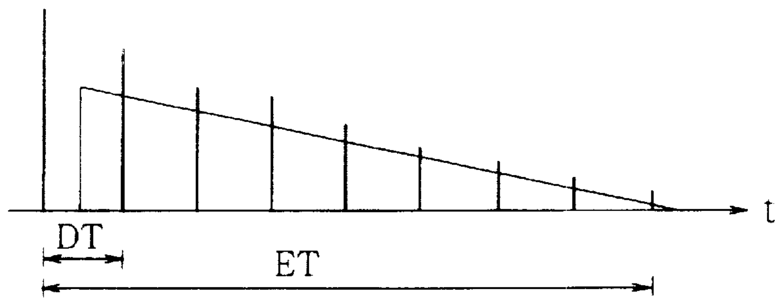
FIGS. 10(*a*) and 10(*b*) are graphs illustrating a vocal effect created in the ballade mode, wherein FIG. 10(*a*) shows an impulse response and FIG. 10(*b*) shows a frequency characteristic.
Figure 10:
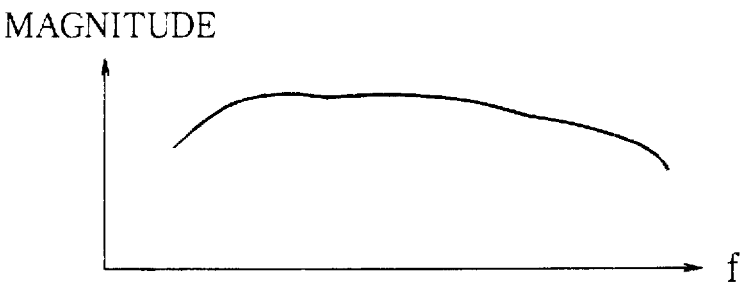

According to the vocal effect circuit 12 shown in FIG. 9, an impulse response as shown in FIG. 10(*a*) is achieved. Specifically, the vocal signal is added with an echo component and a reverb component in parallel to the echo component so as to achieve ample reverberation. In this case, by setting the gain gb (see FIG. 9) great, the echo time ET is set long, for example, about 190 ms so as to match leisurely-tempo music.

As shown in FIG. 10(*b*), the frequency response of the vocal effect circuit 12 is adjusted such that the low-frequency band becomes high for achieving richness of the vocal tones.

(3) Rock Mode

Figure 11:
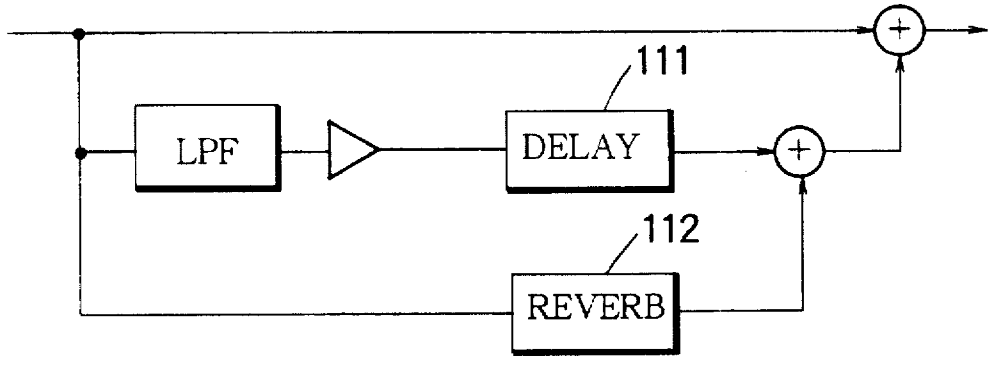
FIG. 11 is a diagram showing an example of a structure of a vocal effect circuit (excluding the characteristic adjuster) adapted in a rock mode.

This mode is selected for giving the vocal effect suitable for relatively high-tempo music such as rock. As shown in FIG. 11, the vocal effect circuit 12 in this mode is arranged such that a delay circuit 111 and a reverb circuit 112 are connected in parallel to each other. Due to the same reason as the foregoing, the frequency characteristic adjuster 33 is not shown in the figure.

Figure 12A:
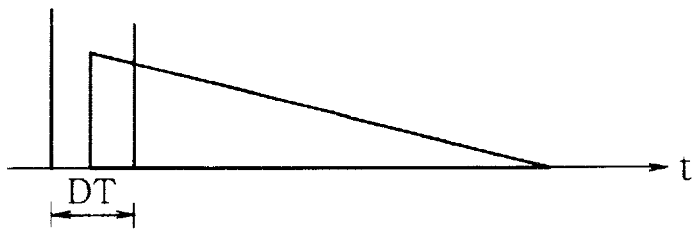
FIGS. 12(*a*) and 12(*b*) are graphs illustrating a vocal effect created in the rock mode, wherein FIG. 12(*a*) shows an impulse response and FIG. 12(*b*) shows a frequency characteristic.
Figure 12B:
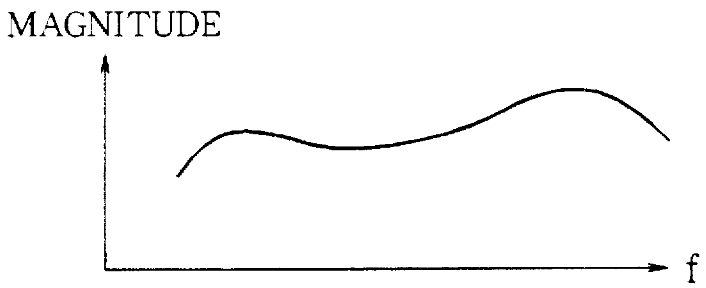

According to the vocal effect circuit 12 shown in FIG. 11, an impulse response as shown in FIG. 12(*a*) is achieved. Specifically, the vocal signal is added with one shot delay component and a reverb component in parallel to each other so as to highlight sharpness and thickness of the vocal tones. The delay time DT is set to a value, for example, about 156 ms suitable for the high-tempo music.

As shown in FIG. 12(*b*), the frequency response of the vocal effect circuit 12 is adjusted such that the low-frequency band and the high-frequency band become high for emphasizing powerfulness and sharpness of the vocal tones.

(4) Professional Mode

Figure 13:
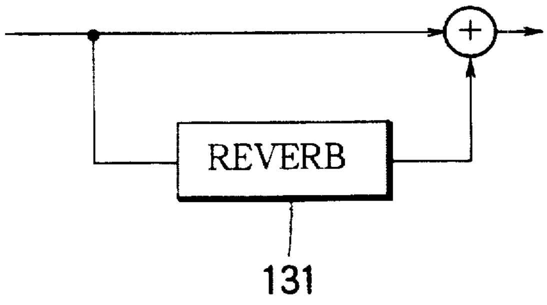
FIG. 13 is a diagram showing an example of a structure of a vocal effect circuit (excluding the frequency characteristic adjuster) adapted in a pro mode.

This mode is selected for giving the vocal effect suitable for a singer having high singing ability or powerful voice. As shown in FIG. 13, the vocal effect circuit 12 in this mode is arranged to have only a reverb circuit 131. Due to the same reason as the foregoing, the frequency characteristic adjuster 33 is not shown in the figure.

Figure 14:
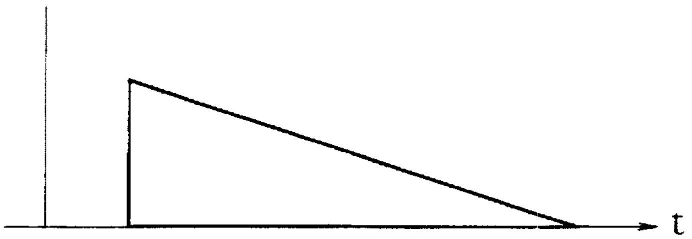
FIGS. 14(*a*) and 14(*b*) are graphs illustrating a vocal effect in the pro mode, wherein FIG. 14(*a*) shows an impulse response and FIG. 14(*b*) shows a frequency characteristic.
Figure 14:
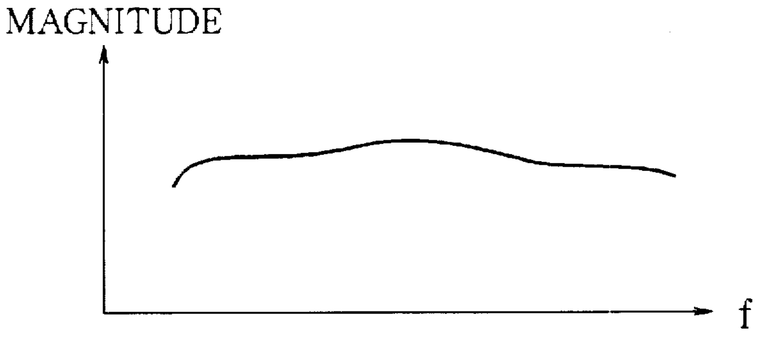

According to the vocal effect circuit 12 shown in FIG. 13, an impulse response as shown in FIG. 14(*a*) can be achieved. Specifically, a reverb component is added to the vocal signal so as to express more fully the vocal tones of the singer having high singing ability or powerful voice. In this case, an echo component is not added so as to prevent the vocal tones of the singer from creating a persistent image.

As shown in FIG. 14(*b*), the frequency response of the vocal effect circuit 12 is adjusted such that an intermediate-frequency band becomes high for highlighting the power of expression of the live vocal tones.

Next, the transitional control of the vocal effect based on the partial control data PD inserted into the music data will be explained. As described above, the vocal effect is controlled, in principle, according to the vocal effect mode designated by the mode data MD at the start of the karaoke performance. However, even in the same musical piece, the tempo may change depending on the progress of the music. Further, the significant part of the music may be highlighted in particular. In view of this, the partial control data PD is inserted in the music data for changing the control of the vocal effect during the karaoke performance, for example, measure by measure so as to modify, by means of the data PD, the vocal effect initially set based on the vocal effect mode.

Specifically, when the effect control information detector 21 detects the partial control data PD in the reproduced music data during the karaoke performance, a coefficient corresponding to the data PD is read out from the data conversion table 22 so that the vocal effect circuit 12 is updated based on the read coefficient. Accordingly, for example, by designating a delay time DT by means of the partial control data PD, at the top of a measure where the tempo of the music changes, it is possible to change the echo delay of the vocal tones depending on the change of the tempo of the music. Further, through designation by the partial control data PD so as to introduce the reverb effect to the main or significant part of the music, it is possible to achieve fullness and sweetness of the vocal tones.

For summary, the inventive karaoke apparatus is provided with the microphone 8 for picking up a live singing voice of a music piece to convert the same into a vocal signal. The music source device is composed of the players 1A, 1B and 1C for providing a music signal representative of a karaoke accompaniment of the music piece to accompany the live singing voice, and for providing effect control information which is predetermined in matching with at least either of a mood and a tempo of the music piece and which is effective to create and control a vocal effect. The vocal effecter device 12 is provided for processing the vocal signal according to the provided effect control information to apply the vocal effect to the live singing voice and to control the applied vocal effect. The mixer device 4 is provided for mixing the provided music signal and the processed vocal signal with each other to concurrently reproduce the karaoke accompaniment and the live singing voice which is modified by the applied vocal effect so as to enrich karaoke performance of the music piece. In a specific form, the music source device comprises means for providing initial effect control information before the karaoke performance is commenced such that the vocal effecter device 12 is established according to the initial effect control information to initially set an adequate vocal effect in generally matching with the music piece. Further, the music source device comprises means for providing transitional effect control information during the course of the karaoke performance to transitionally control the initially set vocal effect in specifically matching with progression of the music piece. In a preferred form, the vocal effecter device 12 comprises the detector 21 for discriminating the provided effect control information to specify a corresponding effect pattern of the vocal effect, the memory means for memorizing a plurality of effect patterns, the microcomputer 20 for retrieving the specified one of the effect patterns from the memory means, and the vocal effect circuit for creating the vocal effect according to the retrieved effect pattern. Specifically, the memory means comprises means for memorizing the effect pattern in the form of a microprogram which is loaded into the vocal effect circuit 12 to enable the same to create the vocal effect. In a specific form, the vocal effecter device 12 comprises the frequency characteristic adjuster 33, the echo effecter 34 and the reverb effecter 35 for creating a specific vocal effect selected from a group consisting of an echo, a reverberation and a frequency characteristic adjustment. For example, the vocal effecter device 12 includes the echo effecter 34 for relatively impressing the echo for a slow tempo of the music piece, and for relatively suppressing the echo for a fast tempo of the music piece.

As described above, according to this embodiment, the proper vocal effect mode corresponding to the music genre or the like of the music piece is automatically selected musical piece by musical piece, and the vocal effect based on such a mode is applied to the live singing voice. Accordingly, it is not necessary for the singer to change the setting of the vocal effect at every request of a karaoke musical piece, and it is not necessary for the singer to check the effect after hearing the performance of the music. Thus, the proper vocal effect can be created from the start of the performance. Further, it is also possible to modify, when the tempo or the like changes during the progress of the music, the vocal effect depending on that change, or to modify the vocal effect at the main or significant part of the music in particular.

The partial control data PD may be inserted into the music data at a regular interval such as every unit of measure. However, the invention is not limited to this. If the effect control information detector 21 can detect the data PD based on identification codes or the like, the data PD may be inserted at random if desired. As in the foregoing embodiment, it may be arranged that the coefficient corresponding to the partial control data PD is read out from the information conversion table 22 for re-setting. However, the invention is not limited to this. The partial control data PD itself may be a coefficient to be set in the vocal effect circuit 12, or may be an offset value for correcting the current set value.

As described above, according to the invention, the proper vocal effect can be automatically selected per musical piece performed, and given to the inputted vocal tones. Further, according to the invention, the vocal effect designated at the start of performance can be changed depending on the progress of the music.

What is claimed is:

1. A karaoke apparatus comprising:

a pickup device that picks up a live singing voice of a music piece and converts the live singing voice into a vocal signal;

a music source device that provides a music signal representative of a karaoke accompaniment of the music piece to accompany the live singing voice, and that provides effect control information which is predetermined so as to match with at least one of a mood and a tempo of the music piece and which is effective to create and control a vocal effect;

a vocal effector device that processes the vocal signal according to the provided effect control information to apply the vocal effect to the live singing voice and to control the applied vocal effect; and a mixer device that mixes the provided music signal and the processed vocal signal to concurrently reproduce the karaoke accompaniment and the live singing voice which has been modified by the applied vocal effects so as to enrich karaoke performance of the music pieces wherein the music source device includes:

means for providing initial effect control information before the karaoke performance is commenced so that the vocal effector device is initiated according to the initial effect control information so as to set an initial vocal effect that generally matches the music piece; and means for providing transitional effect control information during the karaoke performance to transitionally control the initial vocal effect so that the vocal effect specifically matches the progression of the music piece.

2. The karaoke apparatus according to claim 1, wherein the vocal effector device includes:

means for discriminating the provided effect control information to specify a corresponding effect pattern for the vocal effect;

memory means for storing a plurality of effect patterns;

means for retrieving the specified one of the effect patterns from the memory means; and creating means for creating the vocal effect according to the retrieved effect pattern.

3. The karaoke apparatus according to claim 2, wherein the memory means includes means for storing the effect pattern in the form of a microprogram which is loaded into the creating means to enable the creating means to create the vocal effect.

4. The karaoke apparatus according to claim 1, wherein the vocal effector device includes means for creating a specific vocal effect selected from a group consisting of an echo, a reverberation and a frequency characteristic adjustment.

5. The karaoke apparatus according to claim 4, wherein the vocal effector device further includes means for relatively increasing the echo for a slow tempo portion of the music piece, and for relatively decreasing the echo for a fast tempo portion of the music piece.

6. A karaoke method comprising the steps of:

picking up a live singing voice of a music piece and converting the live singing voice into a vocal signal;

providing a music signal representative of a karaoke accompaniment of the music piece to accompany the live singing voice;

providing effect control information which is predetermined so as to match with at least one of a mood and a tempo of the music piece and which is effective to create and control a vocal effect;

processing the vocal signal according to the provided effect control information to apply the vocal effect to the live singing voice and to control the applied vocal effect; and mixing the provided music signal and the processed vocal signal to concurrently reproduce the karaoke accompaniment and the live singing voice which has been modified by the applied vocal effect, so as to enrich karaoke performance of the music piece, wherein the step of providing effect control information includes:

providing initial effect control information before the karaoke performance is commenced so that the vocal effect is initiated according to the initial effect control information so as to set an initial vocal effect that generally matches the music piece; and providing transitional effect control information during the karaoke performance to transitionally control the initial vocal effect so that the vocal effect specifically matches the progression of the music piece.

7. The karaoke method according to claim 6, wherein the step of processing the vocal signal includes the substeps of:

discriminating the provided effect control information to specify a corresponding effect pattern for the vocal effect;

storing a plurality of effect patterns;

retrieving the specified one of the stored effect patterns; and creating the vocal effect according to the retrieved effect pattern.

8. The karaoke method according to claim 7, wherein the substep of storing includes storing the effect pattern in the form of a microprogram which is loaded and executed to create the vocal effect.

9. The karaoke method according to claim 6, wherein the step of processing the vocal signal includes the substep of creating a specific vocal effect selected from a group consisting of an echo, a reverberation and a frequency characteristic adjustment.

10. The karaoke method according to claim 9, wherein the step of processing the vocal signal further includes the substep of relatively increasing the echo for a slow tempo portion of the music piece, and relatively decreasing the echo for a fast tempo portion of the music piece.

* * * * *